United States Patent
Yamamoto et al.

(10) Patent No.: US 10,511,745 B2
(45) Date of Patent: Dec. 17, 2019

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Takayuki Yamamoto, Kanagawa (JP); Yasunari Kishimoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/055,165

(22) Filed: Aug. 6, 2018

(65) Prior Publication Data

US 2019/0132486 A1    May 2, 2019

(30) Foreign Application Priority Data

Oct. 30, 2017   (JP) ................. 2017-209499

(51) Int. Cl.
*H04N 1/60*    (2006.01)
*H04N 1/64*    (2006.01)

(52) U.S. Cl.
CPC ........... *H04N 1/603* (2013.01); *H04N 1/6011* (2013.01); *H04N 1/642* (2013.01)

(58) Field of Classification Search
CPC ....... H04N 1/603; H04N 1/6011; H04N 1/642
USPC ........................................... 358/1.9
See application file for complete search history.

(56) References Cited

U.S. PATENT DOCUMENTS

| | | | |
|---|---|---|---|
| 6,600,574 B2 | 7/2003 | Miyano | |
| 9,600,906 B2* | 3/2017 | Sakai | .................... G06T 11/001 |
| 2011/0058197 A1* | 3/2011 | Kano | ................... H04N 1/6058 358/1.9 |
| 2016/0309060 A1* | 10/2016 | Fukuda | ................ H04N 1/6025 |

FOREIGN PATENT DOCUMENTS

| | | |
|---|---|---|
| JP | 2000047846 | 2/2000 |
| JP | 2004074498 | 3/2004 |
| JP | 6132004 | 4/2016 |

* cited by examiner

*Primary Examiner* — Saeid Ebrahimi Dehkordy
(74) *Attorney, Agent, or Firm* — JCIPRNET

(57) ABSTRACT

An information processing apparatus includes a display and a processor. The display displays an image. The processor causes the display to display a color presenting section that presents color-related information and a multilayer display section that displays a multilayer structure of color-related information selected from the color presenting section.

10 Claims, 8 Drawing Sheets

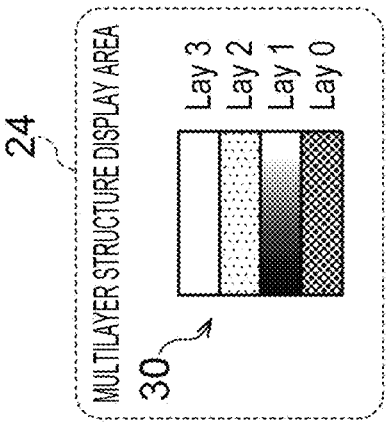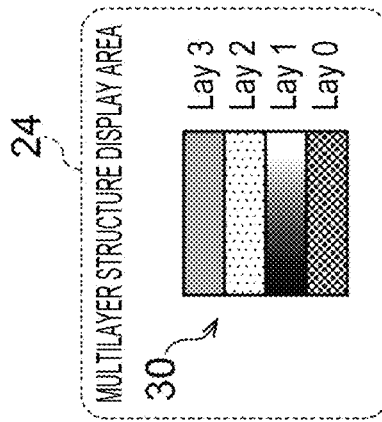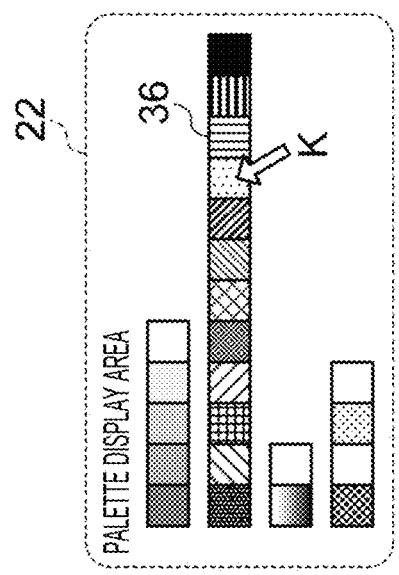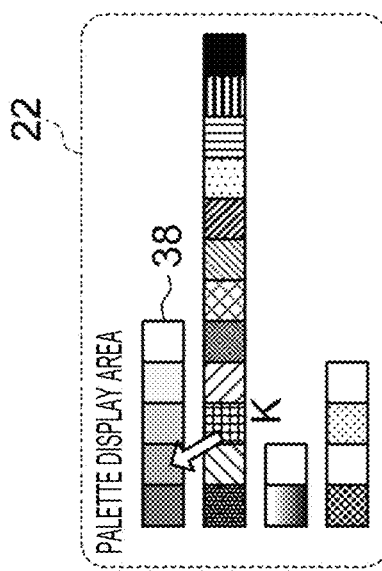
FIG. 3C
FIG. 3D

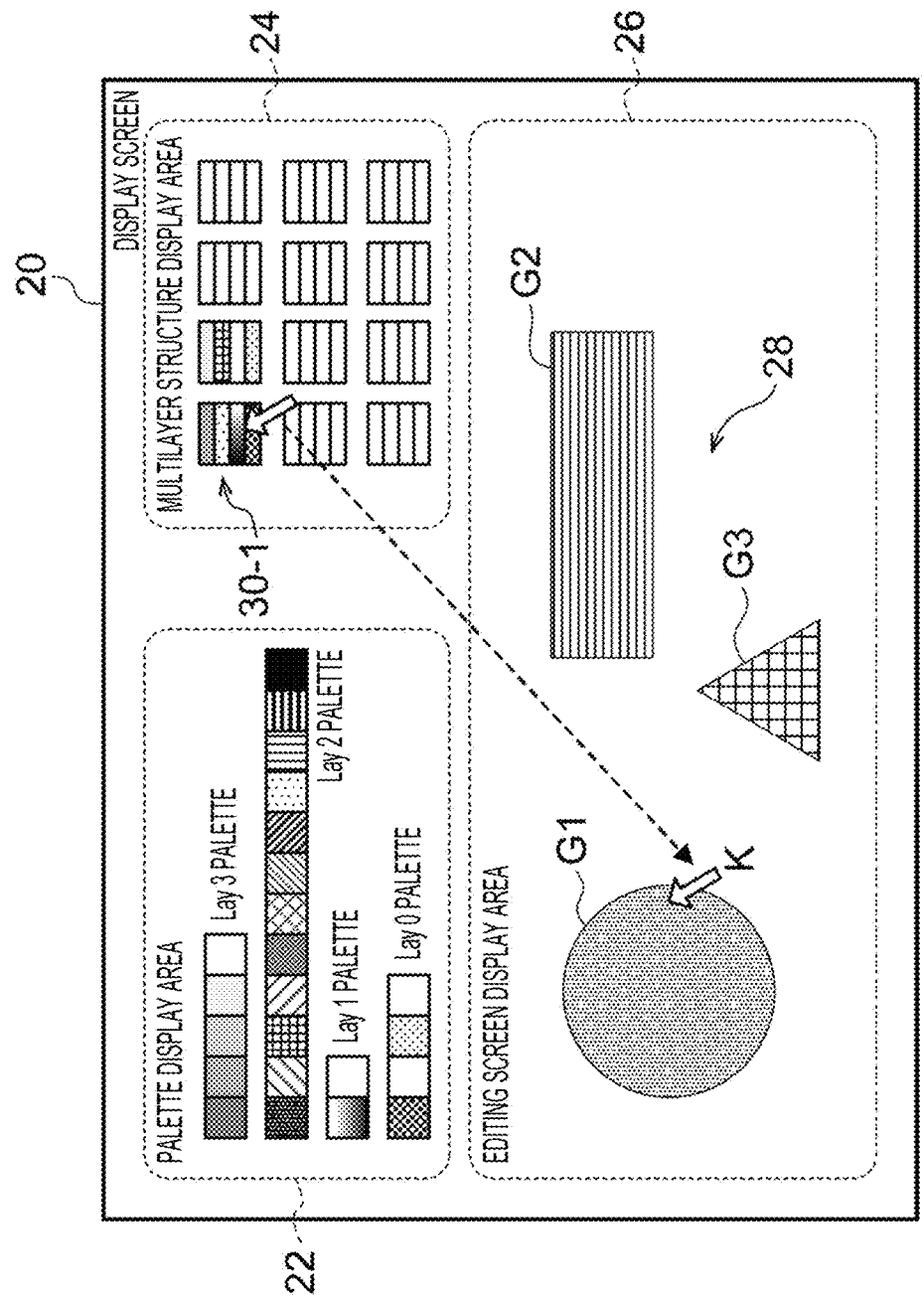

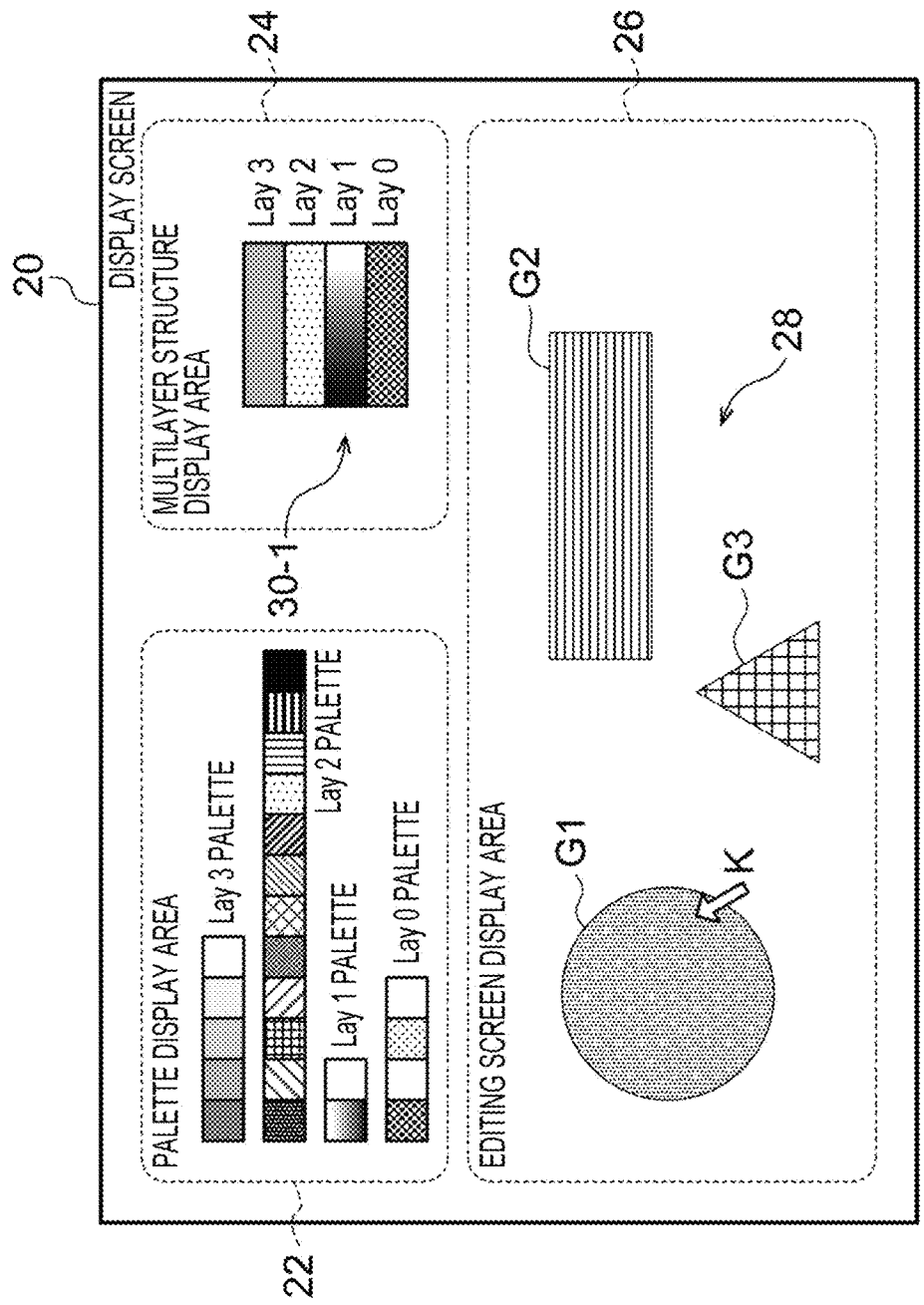

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-209499 filed Oct. 30, 2017.

BACKGROUND

Technical Field

The present invention relates to an information processing apparatus and a non-transitory computer readable medium.

SUMMARY

According to an aspect of the invention, there is provided an information processing apparatus including a display and a processor. The display displays an image. The processor causes the display to display a color presenting section that presents color-related information and a multilayer display section that displays a multilayer structure of color-related information selected from the color presenting section.

BRIEF DESCRIPTION OF THE DRAWINGS

An exemplary embodiment of the present invention will be described in detail based on the following figures, wherein:

FIGS. 3A to 3D include diagrams describing creation of a multilayer structure of color-related information according to the exemplary embodiment;

FIGS. 4A and 4B are diagrams describing specification of the multilayer structure on an editing screen according to the exemplary embodiment; and FIGS. 5A and 5B are diagrams describing display of the multilayer structure of an image being edited according to the exemplary embodiment.

DETAILED DESCRIPTION

Hereinafter, an exemplary embodiment of the present invention will be described in detail with reference to the drawings.

An information processing apparatus and a non-transitory computer readable medium according to the exemplary embodiment will be described with reference to FIGS. 1 to 5B.

Figure 1:
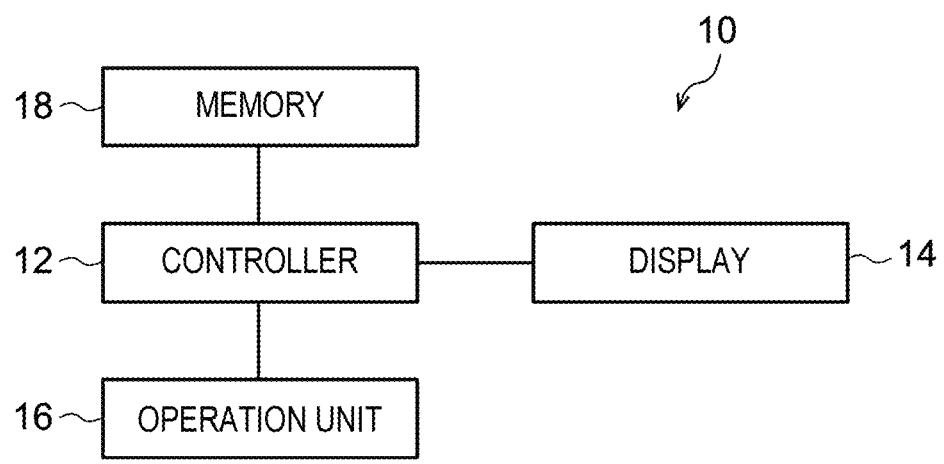
FIG. 1 is a functional block diagram illustrating the schematic configuration of an information processing apparatus according to an exemplary embodiment.

FIG. 1 illustrates an exemplary configuration of an information processing apparatus 10 according to the exemplary embodiment. As illustrated in FIG. 1, the information processing apparatus 10 according to the exemplary embodiment includes a controller 12, a display 14, an operation unit 16, and memory 18. The information processing apparatus 10 has the function of editing an image via a user interface (UI) displayed on the display 14, particularly the function of editing a multilayer structure of color-related information in a specified area of an image serving as a target being edited (hereinafter referred to as a "target image"). Although there is no particular restriction on the type of target image in the exemplary embodiment, the case of an image to be formed (printed) by an electrophotographic image forming apparatus using toner will be described by way of example.

Note that "color-related information" according to the exemplary embodiment includes not only information on the color names of chromatic colors, but also spot colors such as clear toner, the type of recording medium, and information indicating that no color is arranged. In addition, "multilayer structure" according to the exemplary embodiment refers to multilayer information of color materials for printing in the case where image information is converted to printing information. In addition, "toner" corresponds to a "color material" according to an exemplary embodiment of the present invention. In contrast, because an exemplary embodiment of the present invention is applied not only to an electrophotographic image forming apparatus but also to an inkjet image forming apparatus, "color material" according to the exemplary embodiment includes "droplets (ink)" of the inkjet system in addition to toner.

The controller 12 is, for example, a general personal computer (PC), and includes a central processing unit (CPU), read-only memory (ROM), random-access memory (RAM), and a network interface, which are not illustrated in the drawings. The CPU integrates and controls the entire information processing apparatus 10. The ROM is memory that stores in advance a control program of the information processing apparatus 10. The RAM is memory used as a work area for execution of a program such as the control program.

The display 14 mainly displays a palette display area (window) 22, a multilayer structure display area (window) 24, and an editing screen display area (window) 26, which will be described later and which are UIs for executing information processing according to the exemplary embodiment. Although there is no particular restriction on the display 14, for example, a liquid crystal monitor, a cathode ray tube (CRT) monitor, or a flat panel display (FPD) monitor is used as the display 14. In the following description, the palette display area 22, the multilayer structure display area 24, and the editing screen display area 26 may be collectively referred to as "display areas". Note that the palette display area 22, the multilayer structure display area 24, and the editing screen display area 26 correspond to a "color presenting section", a "multilayer display section", and a "target display section", respectively, according to an exemplary embodiment of the present invention.

The operation unit 16 is a member for an operator (user) to operate the display areas, and includes, for example, a keyboard and a pointing device (a mouse, a stylus, and the like).

The memory 18 is a member that mainly stores a later-described multilayer structure edited in the display areas, and a target image associated with the multilayer structure. In addition, the memory 18 may store a program for controlling the entire information processing apparatus 10. Although there is no particular restriction on the memory 18, an external storage device such as a hard disk drive (HDD), compact-disc read-only memory (CD-ROM), CD-recordable (CD-R), CD-rewritable (CD-RW), digital versatile disc (DVD) ROM, DVD-R, DVD-RW, or DVD-RAM is used as the memory 18.

Figure 2:
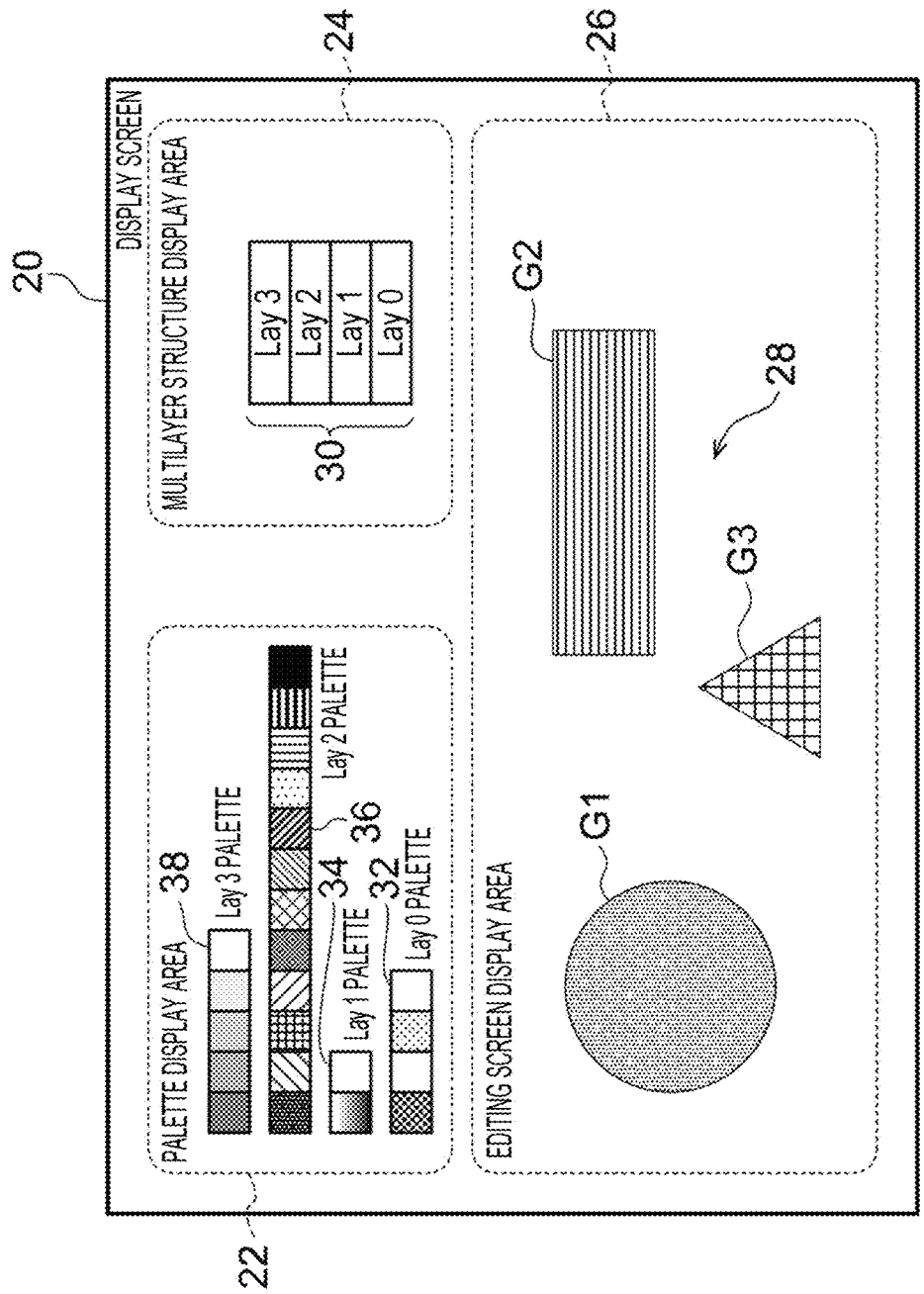
FIG. 2 is a diagram illustrating the screen configuration of a display according to the exemplary embodiment.

FIG. 2 illustrates a display screen 20, which is a screen of the display 14. The display screen 20 illustrated in FIG. 2 displays, by way of example of an editing screen (UI screen), the palette display area 22, the multilayer structure display area 24, and the editing screen display area 26. These display areas are operated by the operation unit 16 including a mouse.

The editing screen display area 26 is an area that displays a target image 28, which is a target being edited. In the example illustrated in FIG. 2, the target image 28 including partial images G1, G2, and G3 is displayed. As has been described above, the target image 28 according to the exemplary embodiment is an image formed by an electrophotographic image forming apparatus using toner by way of example.

The multilayer structure display area 24 is a window that displays a multilayer structure 30 of color-related information provided for editing an image. For example, an image forming apparatus using toner may form an image by superimposing toner (overprinting). The multilayer structure display area 24 displays a configuration of overlapping layers of color-related information in that case. Although there is no particular restriction on the number of layers of the multilayer structure 30, the layers in the exemplary embodiment are four layers, which are namely the zeroth layer, the first layer, the second layer, and the third layer from bottom to top. In the following description, the zeroth layer, the first layer, the second layer, and the third layer may be represented as "Lay 0", "Lay 1", "Lay 2", and "Lay 3", respectively. Details of the layers will be described later.

The palette display area 22 is a window for selecting color-related information of the individual layers of the multilayer structure 30. In the exemplary embodiment, each layer of the multilayer structure 30 is provided with a palette. That is, a Lay 0 palette 32, a Lay 1 palette 34, a Lay 2 palette 36, and a Lay 3 palette 38 are provided. Although a configuration where each layer is individually provided with a palette is described by way of example in the exemplary embodiment, the case is not restricted to this configuration, and palettes of all the layers may be combined as one common palette and this common palette may be displayed.

Here, for example, in the case of editing an image including overprinting by the image forming apparatus, because this image displayed on a display is RGB-displayed, color differences among the stacked layers that are overprinted or color differences due to differences in the order of stacking layers are not presented. In addition, as a color selecting method of the related art, it has been generally done to refer to color samples and to specify color numbers. There has been no idea to select from color-related information displayed on a screen for editing an image. Therefore, on an editing screen of the related art, no editing is done while checking the visual effects of overprinting. As a result, it has been difficult for the user to imagine what the printed result would be.

In contrast, the image forming apparatus generally forms an image using black (K), cyan (C), magenta (M), yellow (Y), which are referred to as "process colors", or mixed colors of these colors. Besides these colors, the image forming apparatus may use special colors called "spot colors", expecting various color-related effects. Examples of spot colors include gold, silver, transparent colors (clear colors), white, fluorescent colors, and pearl colors. Examples of expected effects of spot colors include the so-called textures, such as glossiness, metallicness, roughness (unevenness), and unique colorfulness. However, an editing screen of the related art does not present these textures. Therefore, on an editing screen of the related art, no editing is done while checking the visual effects of textures of spot colors. As a result, it has been difficult for the user to imagine what the printed result would be.

To this end, in an exemplary embodiment of the present invention, it is configured to allow editing of a multilayer structure of color-related information, and to further allow specification of a multilayer structure of color-related information in each image area of a target image. Accordingly, an information processing apparatus provided with an editing screen on which visual effects of overlapping colors are checked, and a non-transitory computer readable medium storing a program are provided.

Referring to FIGS. 2 and 3A to 3D, the multilayer structure 30 according to the exemplary embodiment will be described in more detail. As has been described above, the multilayer structure 30 has four specification layers of color-related information by way of example. In the exemplary embodiment, as a basic form of the multilayer structure 30, the types of color-related information are assigned to the individual layers as follows:

The zeroth layer (Lay 0): type of recording medium
The first layer (Lay 1): base color
The second layer (Lay 2): chromatic color
The third layer (Lay 3): spot color The type of recording medium in the zeroth layer includes, for example, white paper, black paper, coated paper, matte paper, and overhead projector (OHP) film paper. The first layer is a layer of the base color, and is, for example, a layer of white toner or transparent color toner in the exemplary embodiment. White toner serving as the base color assumes the case in which individual colors of colored toner will be arranged on top of this white layer as one form of the multilayer structure 30. Multiple choices of white toner layers may be provided, taking into consideration the tone of toner itself and whether there are effects such as matte colors. The second layer is a layer where colors are arranged on a target image in accordance with specification of colored toner (K, C, M, and Y) or RGB colors (hereinafter these colors are collectively referred to as "chromatic colors"). The third layer is a layer of spot colors. Examples of spot colors include gold toner, silver toner, clear toner (transparent color toner), and white toner. Multiple choices may be provided for each spot color toner, taking into consideration differences in reflection effects, for example. Note that the types of color-related information assigned to the individual layers are not restricted to those described above, and the types may be changed in accordance with an image to be actually formed. In addition, the number of layers of color-related information is not restricted to four layers, and a necessary number of layers may be arranged.

Referring to FIGS. 3A to 3D, an example of a method of creating the multilayer structure 30 will be described. FIGS. 3A to 3D include diagrams illustrating the palette display area 22 and the hierarchical structure display area 24 extracted from FIG. 2, and these diagrams illustrate a method of assigning color-related information to the individual layers Lay 1 to Lay 3.

Figure 3A:
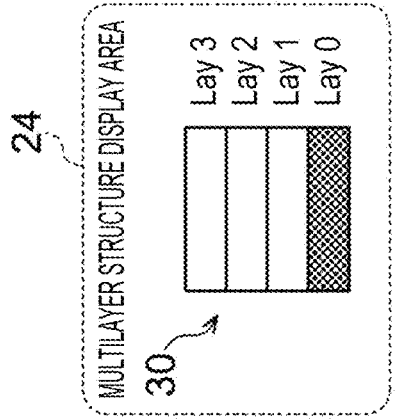

At first, as illustrated in FIG. 3A, the type of recording medium is selected from the Lay 0 palette 32 displayed in the palette display area 22 by double-clicking on it using a cursor K. In response to this, the selected recording medium is displayed in the Lay 0 portion of the multilayer structure 30 in the hierarchical structure display area 24. Although the types of recording media are represented by pattern images in the palette display area 22 in this example, the representation is not restricted to this case, and the types of recording media may be represented by their names.

Figure 3B:
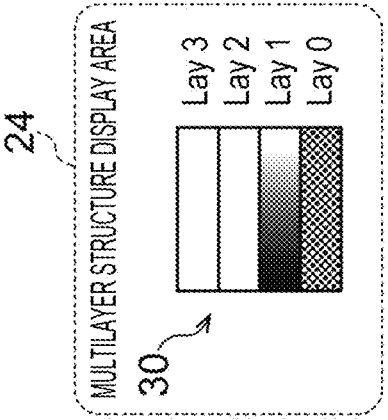

Next, as illustrated in FIG. 3B, for example, white toner is selected from the Lay 1 palette 34 in the palette display area 22 and is displayed in the hierarchical structure display area 24. An intended one is selected from among white toners with different tones, even though these white toners are still the same white toner. Needless to say, Lay 1 is not selected when no white base is to be arranged.

Next, as illustrated in FIG. 3C, a chromatic color is selected from the Lay 2 palette 36 in the palette display area 22 and is displayed in the hierarchical structure display area 24.

Next, as illustrated in FIG. 3D, for example, clear toner is selected from the Lay 3 palette 38 in the palette display area 22 and is displayed in the hierarchical structure display area 24. An intended one is selected from among clear toners with different glossy effects, even though these clear toners are still the same clear toner. Needless to say, Lay 3 is not selected when no glossy effect is intended.

Color-related information is assigned to the individual layers of the multilayer structure 30 as described above. The assigned information may be stored in memory such as the memory 18 in the form of (Lay 0, Lay 1, Lay2, Lay 3). That is, the assigned information may be stored in the form of (Lay 0, Lay 1, Lay2, Lay 3)=(white paper, white toner, red, clear toner).

In response to operations via the operation unit 16 as described above, the multilayer structure 30 is visually generated in the hierarchical structure display area 24. The generated multilayer structure 30 may be stored in memory such as the memory 18 in order to be used later for forming an image by the image forming apparatus. At that time, to be reused as general data independent of the recording medium, the multilayer structure 30 may be saved except for the data of Lay 1. In this case, the data of Lay 1 is added to the multilayer structure 30 as necessary for the actual printing. In contrast, in the case of the multilayer structure 30 including Lay 1, the multilayer structure 30 from which Lay 1 has been removed may be used for the actual printing. Although the case in which color-related information is assigned to all the layers of Lay 0 to Lay 3 has been described by way of example in the above-described exemplary embodiment, there may be a layer to which no color-related information is assigned.

Here, a specific example of the multilayer structure 30 will be described in more detail. In the case of forming a white base on black paper, adding a chromatic color on top of it, and further making the result glossier, the multilayer structure 30 having, for example, (Lay 0, Lay 1, Lay 2, Lay 3)=(black paper, white toner, red, clear toner) is created. The multilayer structure 30 in this example is used when, for example, the base color will be hidden by white toner. At this time, when no recording medium is specified, the multilayer structure 30 having, for example, (Lay 0, Lay 1, Lay2, Lay 3)=(0, white toner, red, clear toner) is created. Note that the data "0" means that there is no specification. In addition, when the multilayer structure 30 having, for example, (Lay 0, Lay 1, Lay2, Lay 3)=(0, 0, 0, white toner) is created, the multilayer structure 30 becomes one where white toner is arranged on the uppermost layer. Furthermore, white toner to be arranged as the base color may be distinguished as "W" whereas white toner to be arranged in the uppermost layer is represented as "W⁻". In addition, in the case of printing white toner twice, white toner of the lower layer may be distinguished as "WL" whereas white toner of the upper layer is represented as "WU". Furthermore, in the case of specifying only the recording medium, the multilayer structure 30 having, for example, (Lay 0, Lay 1, Lay2, Lay 3)=(black paper, 0, 0, 0) is created.

Furthermore, the so-called metallic color is also specified using the multilayer structure 30. A metallic color refers to a vivid metallic color, such as metallic red, where, for example, K, C, M, or Y toner is formed on top of gold toner or silver toner. The multilayer structure 30 in this case may be specified having, for example, (Lay 0, Lay 1, Lay2, Lay 3)=(0, silver toner, red, 0).

Figure 4B:
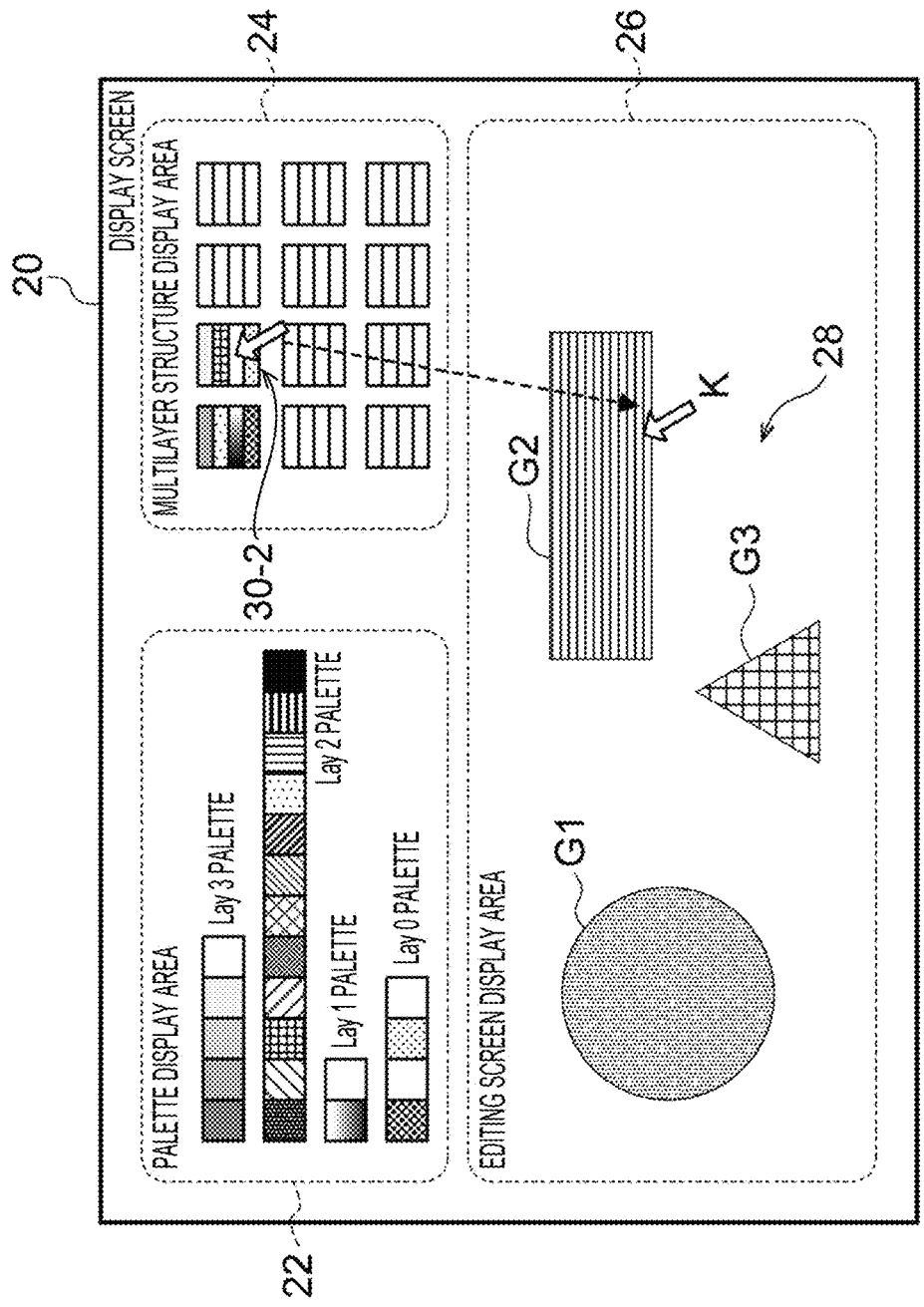
Figure 5B:
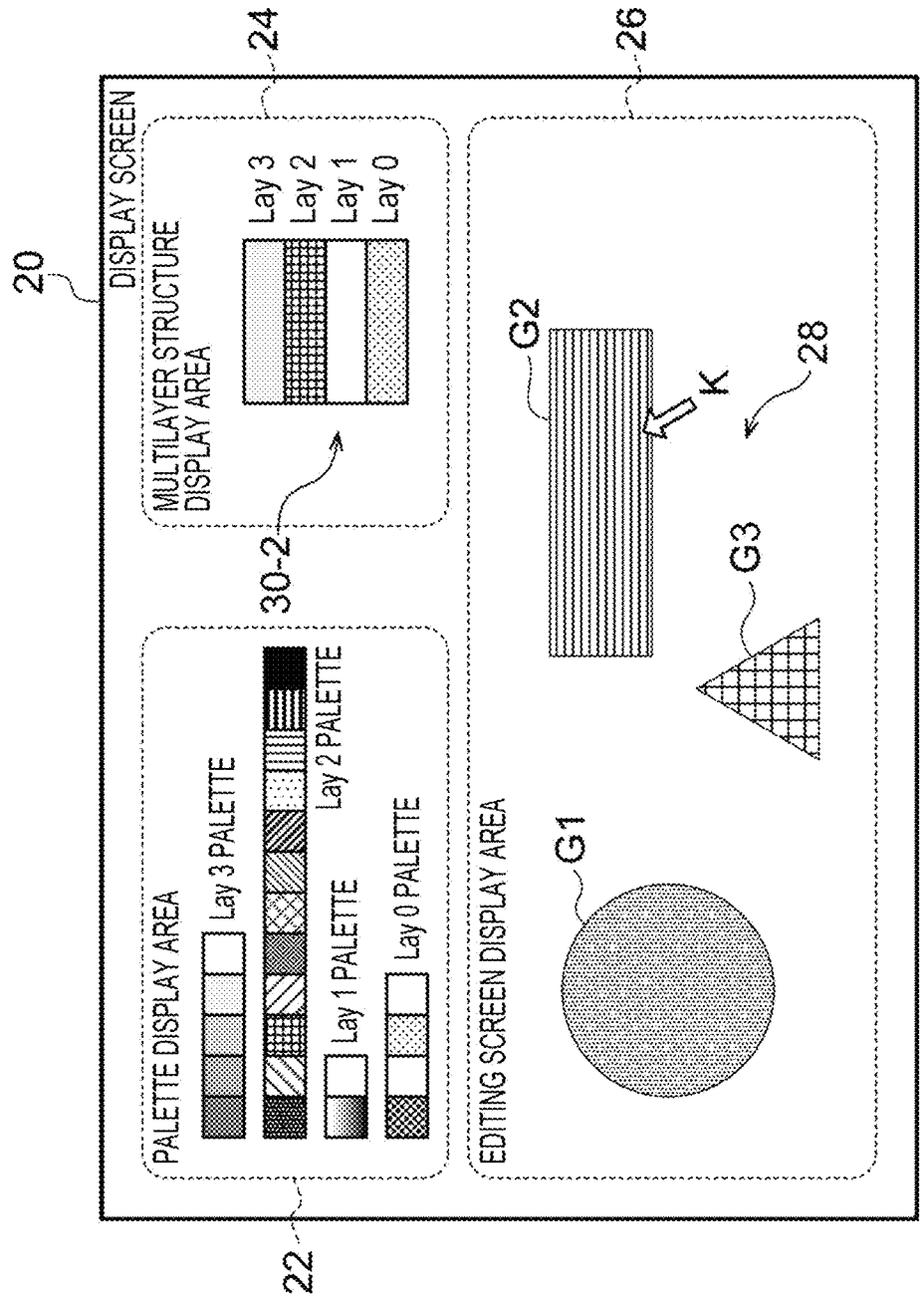

Referring to FIGS. 4A, 4B, 5A, and 5B, editing of the target image 28 will be described. FIGS. 4A and 4B illustrate specification of the multilayer structure 30 for the target image 28, and FIGS. 5A and 5B illustrate reading of the multilayer structure 30 from the target image 28.

In specification of the multilayer structure 30 for the target image 28, as illustrated in FIG. 4A, the target image 28 is first displayed in the editing screen display area 26. The target image 28 in this example includes the partial images G1, G2, and G3. Among these partial images G1, G2, and G3, those for specifying the multilayer structure 30 in this example are the partial images G1 and G2.

In contrast, one or more (twelve in the example illustrated in FIGS. 4A and 4B) necessary multilayer structures 30 are displayed in the hierarchical structure display area 24. The multilayer structures 30 in this case may be created each time by the procedure illustrated in FIGS. 3A to 3D. Alternatively, the multilayer structures 30 stored in advance in the memory 18 may be read and displayed in the hierarchical structure display area 24. In this example, the case where a multilayer structure 30-1 is specified for the partial image G1, and a multilayer structure 30-2 is specified for the partial image G2 is illustrated. Note that the editing screen display area 26 and the hierarchical structure display area 24 in FIGS. 4A and 4B correspond to an "association display section" according to an exemplary embodiment of the present invention.

Next, as illustrated in FIG. 4A, the multilayer structure 30-1 is specified using the cursor K and is drag-and-dropped onto the partial image G1. In doing so, the multilayer structure 30-1 is specified for the partial image G1, which is a partial area of the target image 28.

Next, as illustrated in FIG. 4B, the multilayer structure 30-2 is specified using the cursor K and is drag-and-dropped onto the partial image G2. In doing so, the multilayer structure 30-2 is specified for the partial image G2, which is a partial area of the target image 28.

With the above operations, the multilayer structures are specified for the partial images G1 and G2 of the target image 28. In other words, for example, the coordinate data of the partial image G1 and the multilayer structure 30-1 are associated with each other. The partial image G1 associated with the multilayer structure 30-1 may be stored in memory such as the memory 18. Needless to say, the image area of the partial image G3 for which no such operation as above has been performed remains as the original image data.

Next, referring to FIGS. 5A and 5B, reading of the multilayer structures 30 from the target image 28, for which the multilayer structures 30 have been specified by the operations described using FIGS. 4A and 4B, will be described.

At first, as illustrated in FIG. 5A, the target image 28 is read from memory such as the memory 18 and is displayed in the editing screen display area 26.

Next, to display the multilayer structure 30 of the partial image G1, as illustrated in FIG. 5A, the cursor K is moved to the partial image G1. In doing so, the multilayer structure 30-1 of the partial image G1 is displayed in the hierarchical structure display area 24.

In contrast, to display the multilayer structure 30 of the partial image G2, as illustrated in FIG. 5B, the cursor K is moved to the partial image G2. In doing so, the multilayer structure 30-2 of the partial image G2 is displayed in the hierarchical structure display area 24.

Note that the types of spot colors may be different depending on the type of image forming apparatus. In such a case, the display screen 20 whose palette display area 22 is made different is created for each type of image forming apparatus and may be stored in memory such as the memory 18.

Although the case where color-related information is mainly displayed using pattern images in palettes has been described by way of example in the above-described exemplary embodiment, how color-related information is displayed is not restricted to this case, and color-related information may be displayed using characters, symbols, or the like.

Although the case where a multilayer structure is specified for each partial image of the target image 28 has been described by way of example in the above-described exemplary embodiment, how a multilayer structure is specified is not restricted to the above case, and a multilayer structure for the entire recording medium may be specified in accordance with glossiness, roughness, or the like.

Each process performed by the information processing apparatus according to the above-described exemplary embodiment may be recorded in memory as a program for causing a computer to execute the process and may be distributed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a display that displays an image; and
   a processor that causes the display to display a color presenting section that presents color-related information and a multilayer display section that displays a multilayer structure of color-related information selected from the color presenting section, wherein the multilayer structure of the color-related information includes a plurality of overlapping layers of the color-related information.

2. The information processing apparatus according to claim 1, wherein the processor further causes the display to display a target display section that displays a processing target image, and an association display section that associates the multilayer structure with a specified area of the processing target image displayed in the target display section.

3. The information processing apparatus according to claim 2, further comprising:
   memory that stores information,
   wherein the processor causes the memory to store a pre-created multilayer structure or the specified area and the multilayer structure associated with the specified area in association with each other.

4. The information processing apparatus according to claim 2, wherein the processor further causes the multilayer display section to display the multilayer structure in a specified area of the processing target image displayed in the target display section.

5. The information processing apparatus according to claim 2, wherein:
   the processing target image is an image formed with a color material on a recording medium, and
   the multilayer structure includes, from bottom to top, a colored color material layer and a spot-color color material layer.

6. The information processing apparatus according to claim 5, wherein the multilayer structure further includes a white color material layer below the colored color material layer.

7. The information processing apparatus according to claim 6, wherein the multilayer structure further includes, below the white color material layer, a recording medium layer for specifying a type of recording medium.

8. The information processing apparatus according to claim 1, wherein the processor causes the display to display the color presenting section for each of layers included in the multilayer structure.

9. A non-transitory computer readable medium storing a program causing a computer to function as:
   a display that displays an image; and
   a processor that causes the display to display a color presenting section that presents color-related information and a multilayer display section that displays a multilayer structure of color-related information selected from the color presenting section, wherein the multilayer structure of the color-related information includes a plurality of overlapping layers of the color-related information.

10. An information processing apparatus comprising:
    display means for displaying an image; and
    processing means for causing the display means to display a color presenting section that presents color-related information and a multilayer display section that displays a multilayer structure of color-related information selected from the color presenting section, wherein the multilayer structure of the color-related information includes a plurality of overlapping layers of the color-related information.

* * * * *